United States Patent
Mazzone

(10) Patent No.: US 8,412,944 B1
(45) Date of Patent: Apr. 2, 2013

(54) DOCUMENT CERTIFICATION SYSTEM AND METHOD

(76) Inventor: Pasquale Mazzone, Clearwater, FL (US)

(*) Notice: Subject to any disclaimer, the term of this patent is extended or adjusted under 35 U.S.C. 154(b) by 119 days.

(21) Appl. No.: 12/928,759

(22) Filed: Dec. 17, 2010

(51) Int. Cl.
*G06F 21/00* (2006.01)

(52) U.S. Cl. .......... 713/176; 726/5; 726/7; 726/28; 713/170; 713/175; 455/90.2; 705/38; 709/229; 380/30

(58) Field of Classification Search .......... 713/161, 713/176
See application file for complete search history.

(56) References Cited

U.S. PATENT DOCUMENTS

| | | | |
|---|---|---|---|
| 7,219,304 B1 * | 5/2007 | Kraenzel et al. | 715/755 |
| 7,581,102 B2 * | 8/2009 | Yasuda | 713/175 |
| 2003/0033528 A1 * | 2/2003 | Ozog et al. | 713/170 |
| 2005/0120217 A1 * | 6/2005 | Fifield et al. | 713/176 |
| 2005/0138382 A1 * | 6/2005 | Hougaard et al. | 713/176 |
| 2006/0161781 A1 * | 7/2006 | Rice et al. | 713/176 |
| 2007/0094510 A1 * | 4/2007 | Ross et al. | 713/178 |
| 2007/0107065 A1 * | 5/2007 | Asaumi | 726/28 |
| 2008/0082829 A1 * | 4/2008 | Yoshioka et al. | 713/176 |
| 2010/0217996 A1 * | 8/2010 | Ross et al. | 713/179 |
| 2010/0257367 A1 * | 10/2010 | Johnson et al. | 713/175 |
| 2011/0302210 A1 * | 12/2011 | Comanescu | 707/784 |

OTHER PUBLICATIONS

Vamplew et al., "An anti-plagiarism editor for software development courses", Proceeding ACE '05 Proceedings of the 7th Australasian conference on Computing education—vol. 42, pp. 83-90.*

* cited by examiner

*Primary Examiner* — Morshed Mehedi

(57) ABSTRACT

A professional subscriber station, a document authority station and a client station are provided. The professional subscriber station has a first electronic device for creating a document for being certified. The document authority station has a second electronic device adapted to receive the document and to certify the document and to transmit a document of certification and a cover sheet with codes to the professional subscriber station. The client station is adapted to receive the document and cover sheet with codes from the professional subscriber station. The client station has a third electronic device for viewing the certificate of authenticity at the client station and the document.

2 Claims, 6 Drawing Sheets

DOCUMENT CERTIFICATION SYSTEM AND METHOD

BACKGROUND OF THE INVENTION

Field of the Invention

The present invention relates to a document certification system and method and more particularly pertains to certifying both the identity of the professional person who generated a transmitted document as well as the integrity of such document, the certifying of the identity and the integrity being done in a secure, convenient and economical manner.

SUMMARY OF THE INVENTION

In view of the disadvantages inherent in the known types of certification systems of known designs and configurations now present in the prior art, the present invention provides an improved document certification system and method. As such, the general purpose of the present invention, which will be described subsequently in greater detail, is to provide a new and improved document certification system and method which has all the advantages of the prior art and none of the disadvantages.

To attain this, the present invention essentially comprises a document certification system and method. First provided is a plurality of professional subscriber stations. A document authority station is provided. Also provided is a plurality of client stations.

Each professional subscriber station has a first first electronic device. A specific document is created through the first electronic device for being certified through the document authority station for at least one client station of the plurality of client stations.

The document authority station has a web site. The web site includes a home page. The document authority station also has a second electronic device adapted to receive the specific document from the professional subscriber station. A coded cover sheet related to the specific document is generated by the second electronic device. The coded cover sheet is adapted to be transmitted first to the professional subscriber station and then by the professional subscriber station to at least one client station.

The at least one client station has a third electronic device. The third electronic device is adapted to receive the coded cover sheet from the professional subscriber station along with the document itself. The third electronic device is then adapted to enter the web site of the document authority for viewing the home page of the document authority and for filling in a document code and a professional code as previously provided on the coded cover sheet.

Provided last, a certificate of authenticity is provided. The certificate of authenticity is adapted to be received from the document authority station and to be viewed at the at least one client station along with the specific document created at the professional subscriber station.

The present invention also includes a document certification method.

The first step is a professional subscriber subscribes to a document authority and after approval receives a unique professional code.

The second step is the professional subscriber enters a specific document with the document authority where the document authority certifies the document and issues a certificate of authenticity and then identifies the document with a unique alphanumeric document code.

The third step is the document authority transmits a coded cover sheet to the professional subscriber.

The fourth step is the professional subscriber sends the certified document and the cover sheet to at least one selected client.

The fifth step is the at least one selected client enters a web site of the document authority and fills in the codes pertinent to both the selected document code and the professional code.

The final step is the at least one selected client views the selected document and the certificate of authenticity with the professional subscriber.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved document certification system and method which has all of the advantages of the prior art certification systems of known designs and configurations and none of the disadvantages.

It is another object of the present invention to provide a new and improved document certification system and method which may be easily and efficiently configured and marketed.

An even further object of the present invention is to provide a new and improved document certification system and method which is susceptible of a low cost thereby making such document certification system and method economically available to the public.

Even still another object of the present invention is to provide a document certification system and method for certifying both the identity of the professional person who generated a transmitted document as well as the integrity of the document, the certifying of the identity and the integrity being done in a secure, convenient and economical manner.

Lastly, it is an object of the present invention to provide a new and improved document certification system and method. A professional subscriber station, a document authority station and a client station are provided. The professional subscriber station has a first electronic device for creating a document for being certified. The document authority station has a second electronic device adapted to receive the document and to certify the document and to transmit a document of certification and a cover sheet with codes to the professional subscriber station. The client station is adapted to receive the document and cover sheet with codes from the professional subscriber station. The client station has a third electronic device for viewing the certificate of authenticity at the client station and the document.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
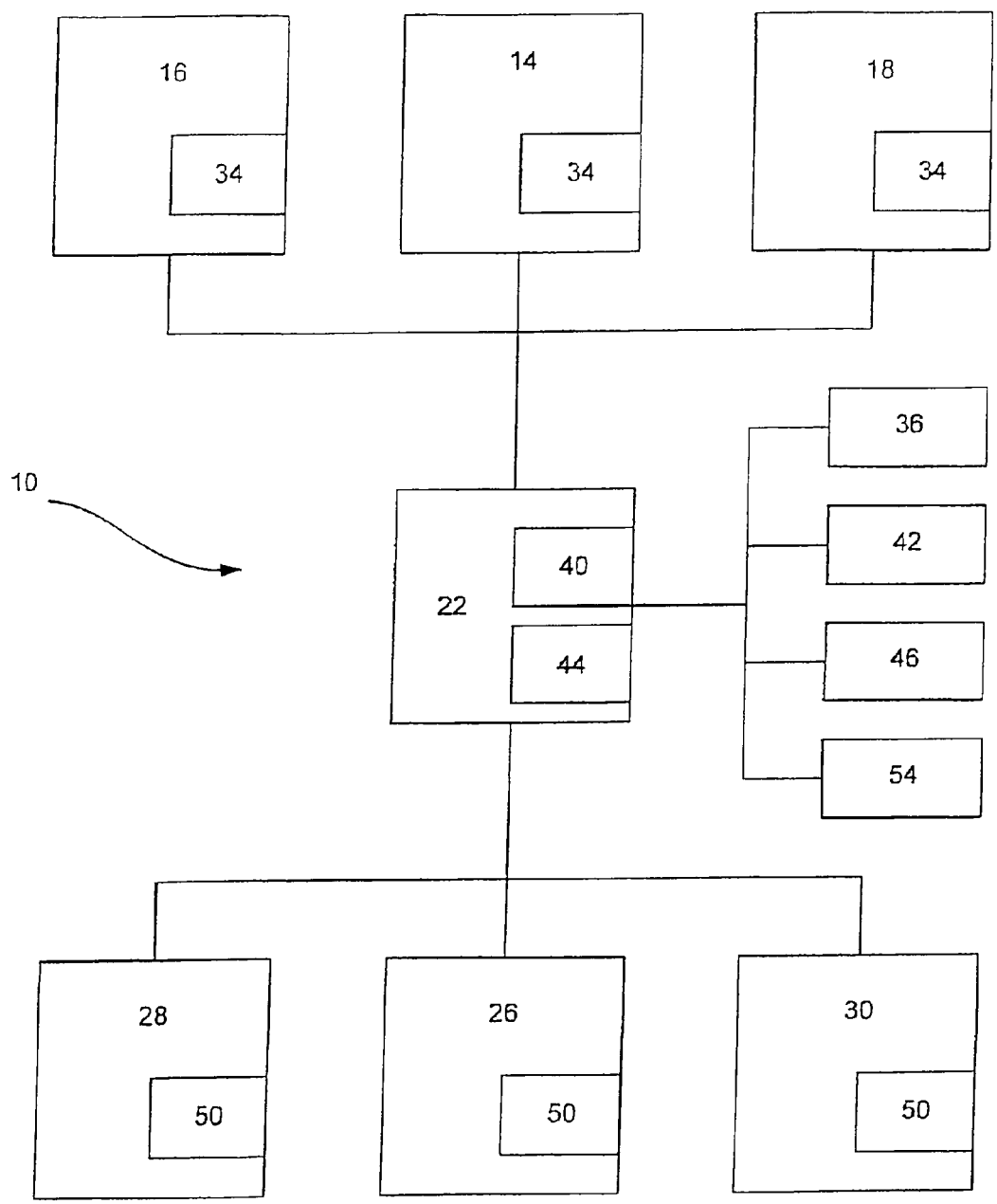
FIG. 1 is a block diagram of a document certification system constructed in accordance with the principles of the present invention.
Figure 2:
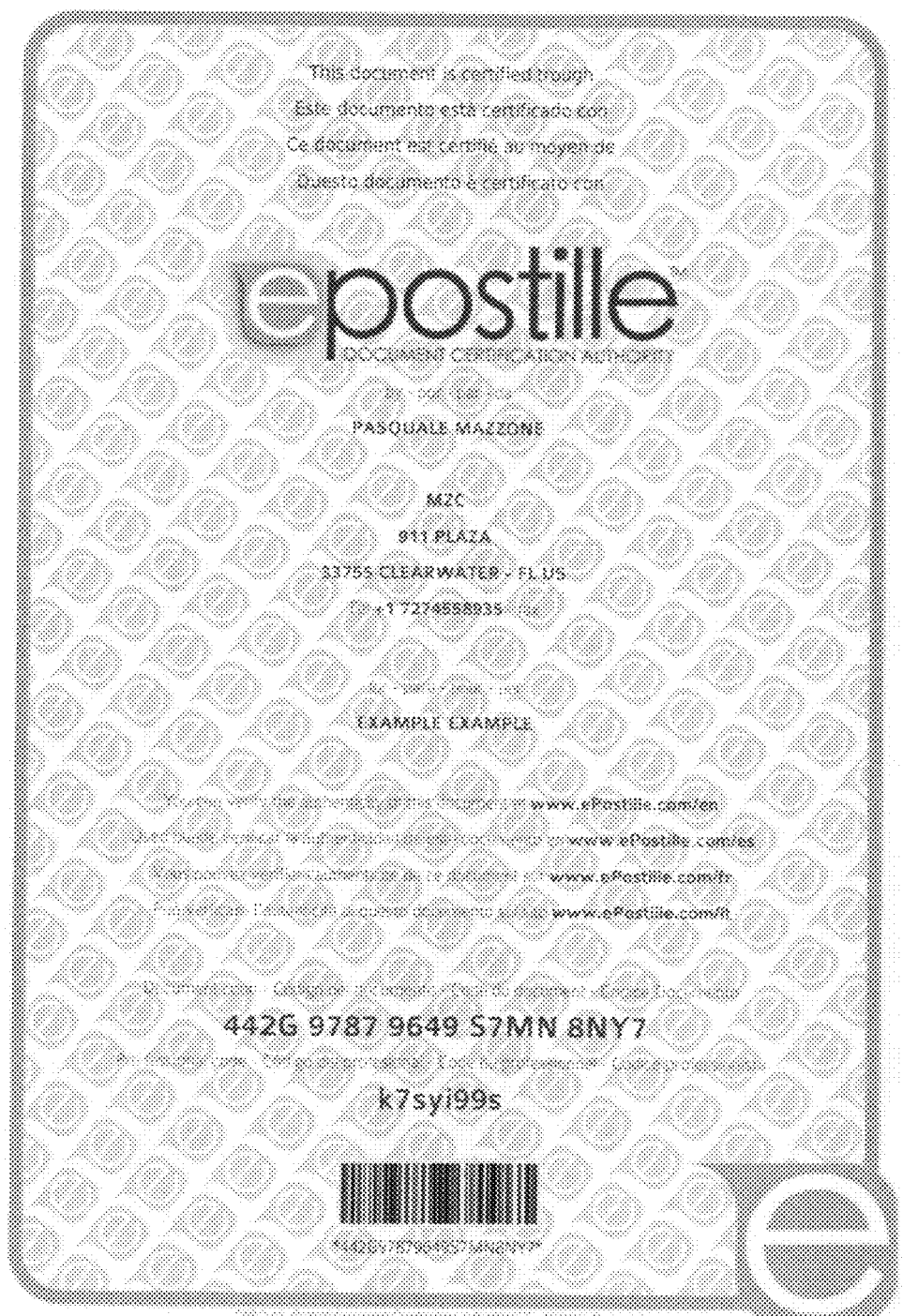
FIG. 2 is an illustration of a coded cover sheet as part of the system of the present invention.
Figure 3:
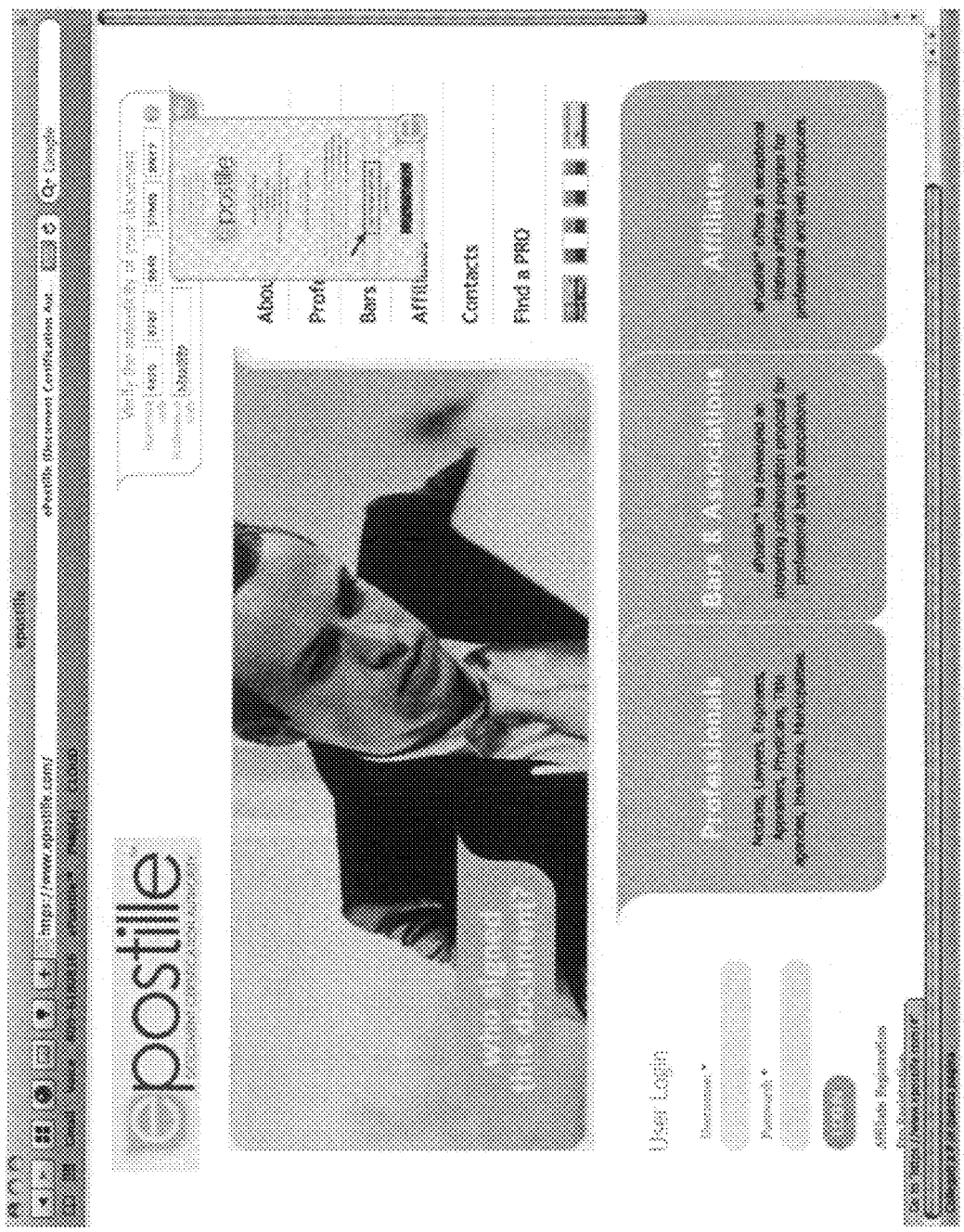
FIG. 3 is an illustration of a home page as part of the system of the present invention.
Figure 4:
FIG. 4 is an illustration of a certificate of authenticity as part of the system of the present invention.
Figure 5:
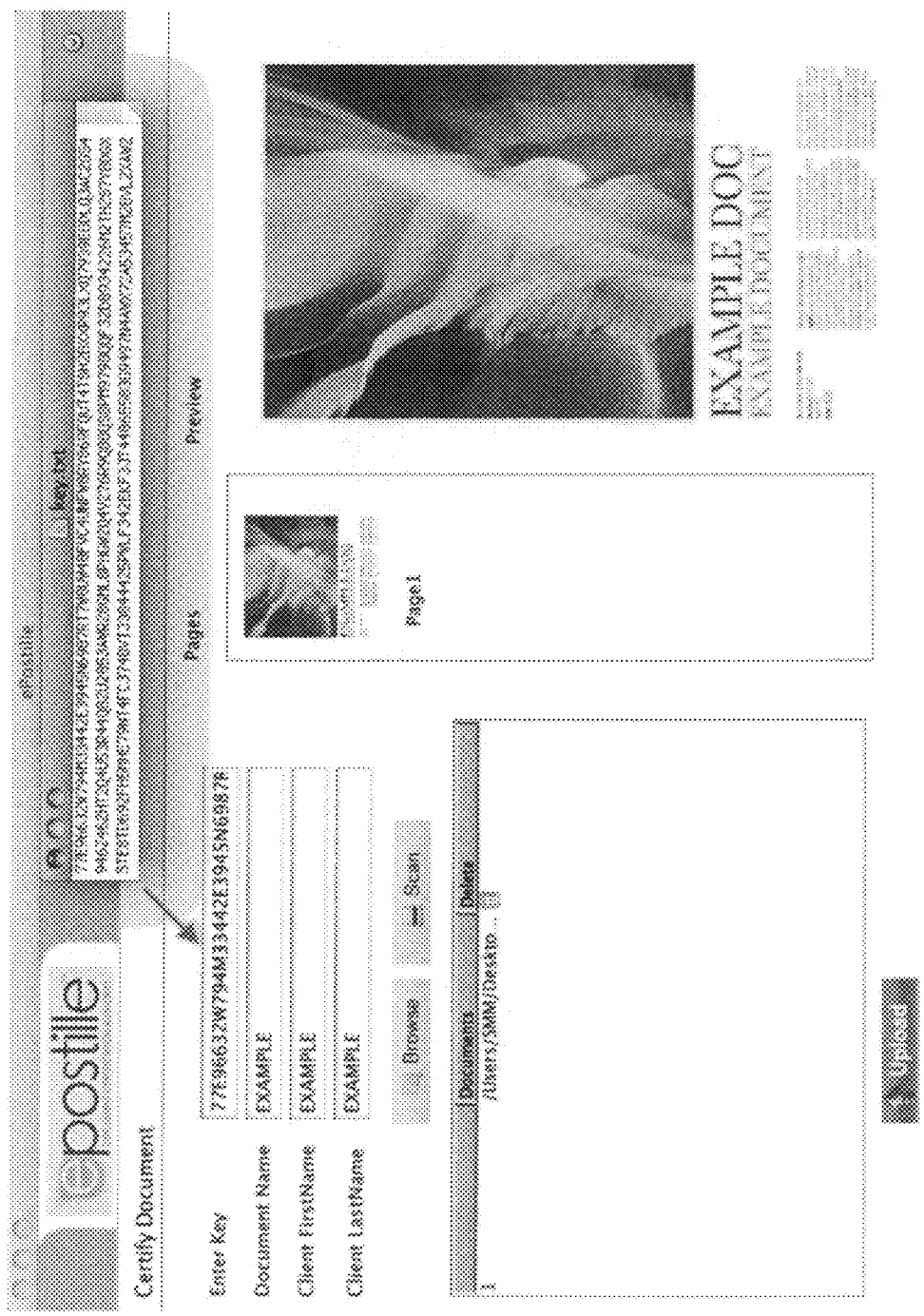
FIG. 5 is a document/device at the professional subscriber station for uploading and certifying the original document.
Figure 6:
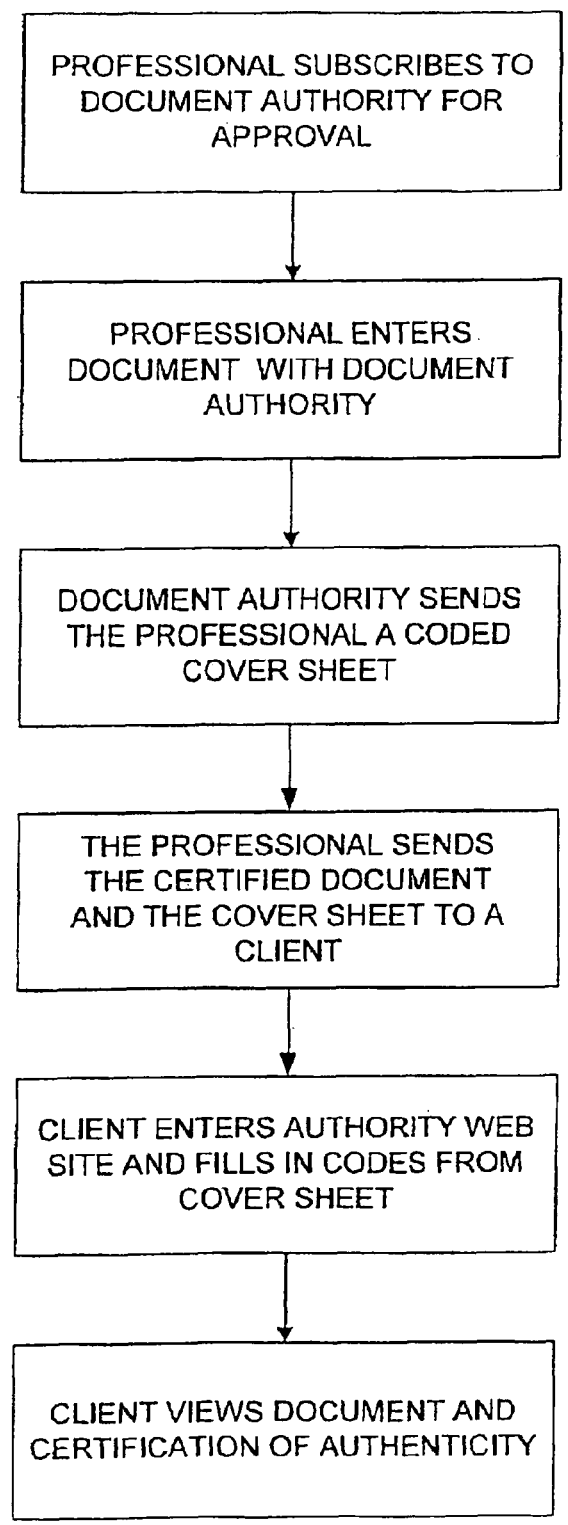
FIG. 6 is a flow diagram of the steps constituting the method of the present invention.

With reference now to the drawings, and in particular to FIG. 1 thereof, the preferred embodiment of the new and improved document certification system and method embodying the principles and concepts of the present invention and generally designated by the reference numeral 10 will be described.

The present invention, the document certification system and method 10 is comprised of a plurality of components. Such components in their broadest context include a professional subscriber station, a document authority station and a client station. Such components are individually configured and correlated with respect to each other so as to attain the desired objective.

First provided is a plurality of professional subscriber stations 14, 16, 18. A document authority station 22 is provided. Also provided is a plurality of client stations 26, 28, 30.

Each professional subscriber station has a first electronic device 34. The electronic device is chosen from the class of electronic devices including a pc, mac, i-phone, web, etc. A specific document 36 is created through the first electronic device for being certified through the document authority station for at least one client station of the plurality of client stations.

The document authority station has a web site 40. The web site includes a home page 42. The document authority station also has a second electronic device 44 adapted to receive the specific document from the professional subscriber station. A coded cover sheet 46 related to the specific document is generated by the second electronic device. The coded cover sheet is adapted to be transmitted first to the professional subscriber station and then by the professional subscriber station to at least one client station The at least one client station has a third electronic device 50. The third electronic device is adapted to receive, whether by hard copy form or in digital form, the coded cover sheet from the professional subscriber station along with the document itself. The third electronic device is then adapted to enter the web site of the document authority for viewing the home page of the document authority and for filling in a document code and a professional code as previously provided on the coded cover sheet.

Lastly, a certificate of authenticity 54 is adapted to be received from the document authority station and to be viewed at the at least one client station along with the specific document created at the professional subscriber station.

The present invention also includes a document certification method. The method is a document certification method for certifying both the identity of the professional person who generated a transmitted document as well as the integrity of the document The certifying of the identity and the integrity are done in a secure, convenient and economical manner. The method comprises several steps.

The first step is a professional subscriber subscribes to a document authority and after approval receives a unique professional code.

The second step is the professional subscriber enters a specific document with the document authority where the document authority certifies the document and issues a certificate of authenticity and then identifies the document with a unique code of plural groups of random alphanumeric document code.

The third step is the document authority transmits a coded cover sheet to the professional subscriber.

The fourth step is the professional subscriber sends, whether in hard copy form or in digital form, the certified document and the cover sheet to at least one selected client.

The fifth step is the at least one selected client enters a web site of the document authority and fills in the codes pertinent to both the selected document code and the professional code.

The final step is the at least one selected client views the selected document and the certificate of authenticity with the professional subscriber.

The present invention is a system and method for professionals: doctors, lawyers, appraisers, notaries and anyone else that needs to certify its own identity and documents to better certify the document he wishes. Basically, we have two layers of certification. The first is the identity of the subscriber, the identity of the professional. We are certain with the present invention that who signed that document is that professional. The second is the document itself that has not been forged or altered in any way.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A document certification system (10) for certifying both an identity of a professional subscriber who generated a document as well as an integrity of the document, the certifying of the identity and the integrity of the document being done in a secure, convenient and economical manner, the system comprising, in combination:

a plurality of professional subscriber stations (14), (16), (18), and a document authority station (22) and a plurality of client stations (26), (28), (30);

each professional subscriber station having a first electronic device (34), a specific document (36) created through the first electronic device for being certified through the document authority station for at least one client station of the plurality of client stations;

the document authority station having a web site (40) with a home page (42), the document authority station also having a second electronic device (44) adapted to receive the specific document from the professional subscriber station, a coded cover sheet (46) related to the specific document generated by the second electronic device adapted to be transmitted first to the professional subscriber station and then by the professional subscriber station to at least one client station;

at least one client station having a third electronic device (50) adapted to receive, by hard copy form or in digital form, the coded cover sheet from the professional subscriber station along with the document itself, the third electronic device then adapted to enter the web site of the document authority for viewing the home page of the document authority and for filling in a document code and a professional code as previously provided on the coded cover sheet, the document code being different from the professional code; and a certification of authenticity document (54) adapted to be received from the document authority station and viewed at the at least one client station along with the specific document created at the professional subscriber station.

2. A document certification method for certifying both an identity of a professional subscriber who generated a document as well as an integrity of the document, the certifying of the identity and the integrity being done in a secure, convenient and economical manner, the method comprising the steps of:

a professional subscriber subscribes to a document authority and after approval receives a unique professional code;

the professional subscriber enters a specific document with the document authority where the document authority certifies the document and issues a certificate of authenticity and then identifies the document with a unique alphanumeric document code different from the professional code;

the document authority transmits a coded cover sheet to the professional subscriber;

the professional subscriber sends the certified document and the cover sheet to at least one selected client;

the at least one selected client enters a web site of the document authority and fills in the codes pertinent to both the selected document code and the professional code; and the at least one selected client views the selected document and the certificate of authenticity with the professional subscriber.

\* \* \* \* \*